Nov. 14, 1967  D. D. LINDQUIST  3,352,031
TRAINING AID FOR INDICATING BINARY TO NON-BINARY CONVERSION
Filed Dec. 6, 1965  4 Sheets-Sheet 1

INVENTOR.
DONALD D. LINDQUIST
BY
McLaughlin, Cahill & Drummond
ATTORNEYS

Nov. 14, 1967  D. D. LINDQUIST  3,352,031
TRAINING AID FOR INDICATING BINARY TO NON-BINARY CONVERSION
Filed Dec. 6, 1965

INVENTOR.
DONALD D. LINDQUIST
BY
McLaughlin, Cahill & Drummond
ATTORNEYS

INVENTOR.
DONALD D. LINDQUIST

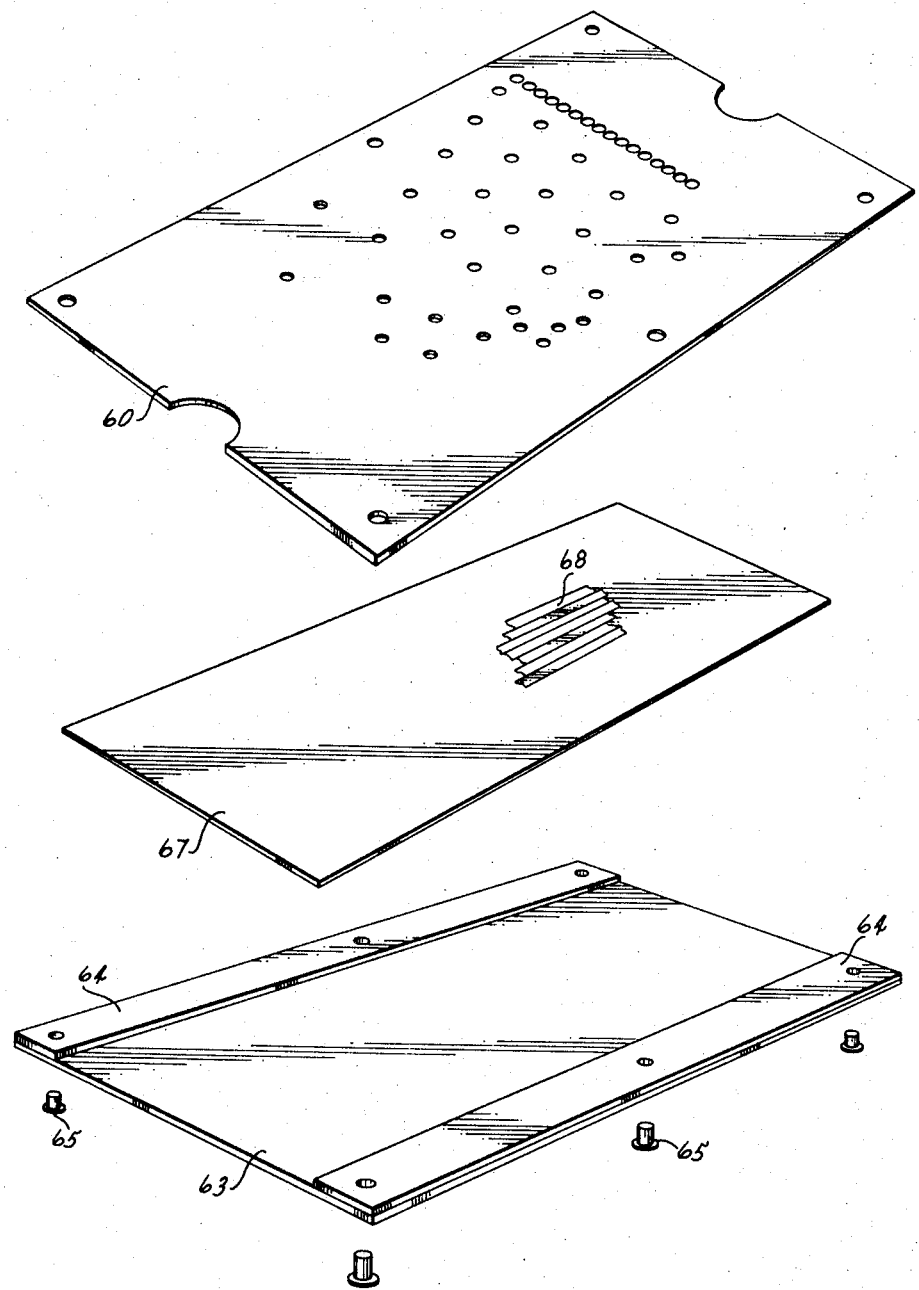

United States Patent Office 3,352,031
Patented Nov. 14, 1967

3,352,031
TRAINING AID FOR INDICATING BINARY
TO NON-BINARY CONVERSION
Donald D. Lindquist, 1241 E. Hayward,
Phoenix, Ariz. 85020
Filed Dec. 6, 1965, Ser. No. 512,596
5 Claims. (Cl. 35—30)

The present invention pertains to training aids, and more particularly, to training aids of the type useful for instructing students on number systems having different radices.

The widespread use of digital computers and data processing systems has led to the inevitable utilization of binary numbering systems as a convenient language with which to communicate to the electronic systems. A variety of codes are used by present-day data processing systems, all of which are based upon a number system having a radix of two. This binary numbering system is uniquely adaptable to electronic circuits since the state of an electrical switch, whether it is a transistor, diode, or other electronic element, may be utilized to determine the value of a binary digit. Since the number system encountered by the average person in everyday life uses a radix of ten, or decimal system, the conversion to a machine-readable form to enable the machine to "read" the numerical information has resulted in translation problems. The difficulty in translation usually evaporates after the initial learning period of the individual; however, during the initial encounter with a numbering system to a radix other than ten, the student will inevitably have difficulty.

It is therefore an object of the present invention to provide a training aid to facilitate teaching the equivalence of binary numbers to non-binary numbers.

It is a further object of the present invention to provide a training aid that permits a student to select a predetermined binary "input" and immediately view the numerical value of that binary input in a non-binary number system.

It is still another object of the present invention to provide a convenient means for demonstrating the relationship of the binary-to-nonbinary code conversion and basic schematic circuitry implemented by the conversion to arrive at an electrical output to achieve the translation from binary to non-binary information.

These and other objects of the present invention will become apparent to those skilled in the art as the description thereof proceeds.

Briefly, in accordance with one embodiment of the present invention, a radix converter is provided comprising a plurality of plates, each plate consisting of a material such as stiff paper or plastic. The plates are positioned one on top of each other and are provided with a plurality of holes. The bottom plate includes colored portions that may be viewed through the holes in the remainder of the plates when these holes have been properly aligned.

The present invention may more readily be described by reference to the accompanying drawings in which:

FIGURE 4 is a perspective exploded view of the emboidment of FIGURE 3.

Figure 1:
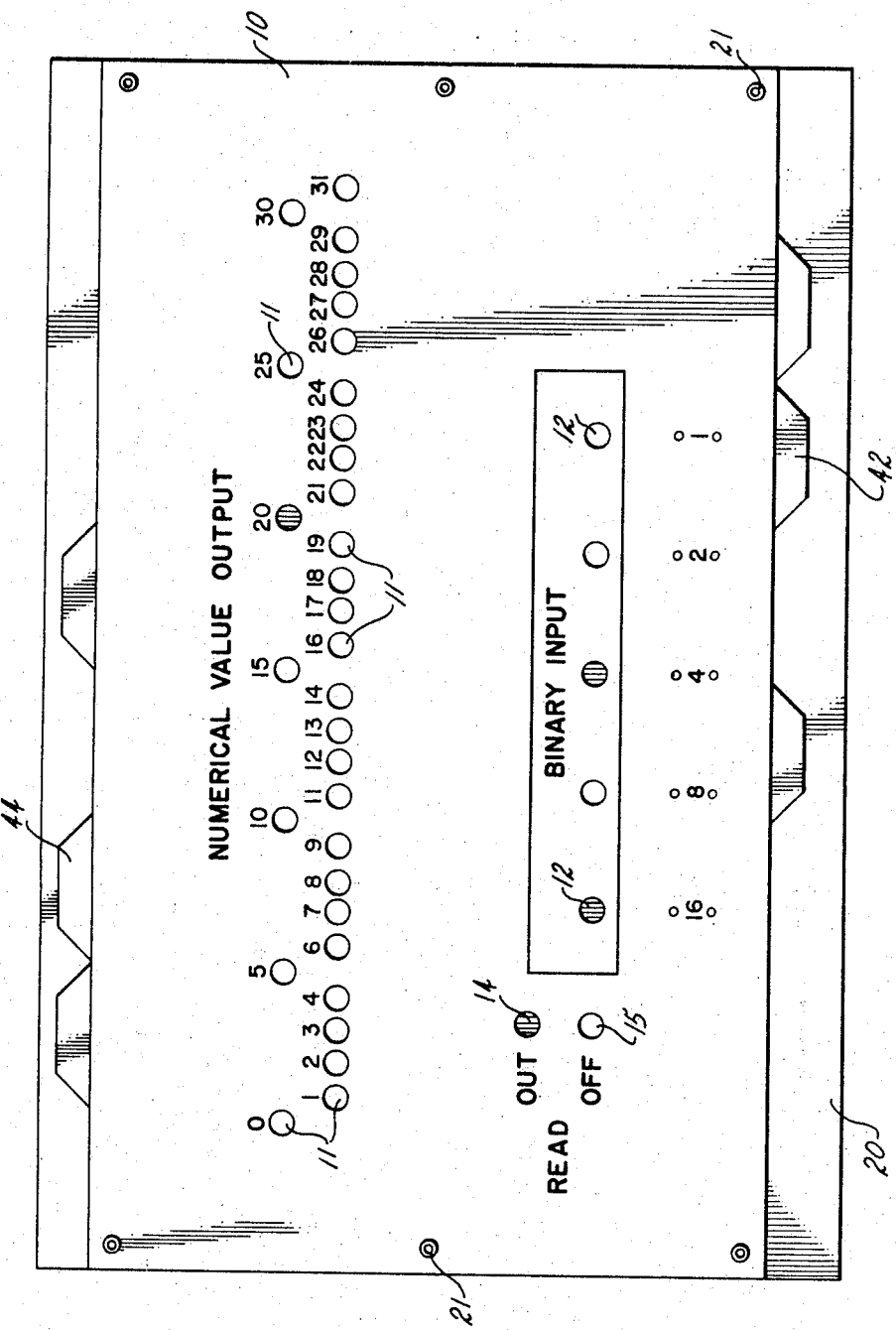
FIGURE 1 is a top view of a training aid constructed in accordance with the teachings of the present invention.
Figure 2:
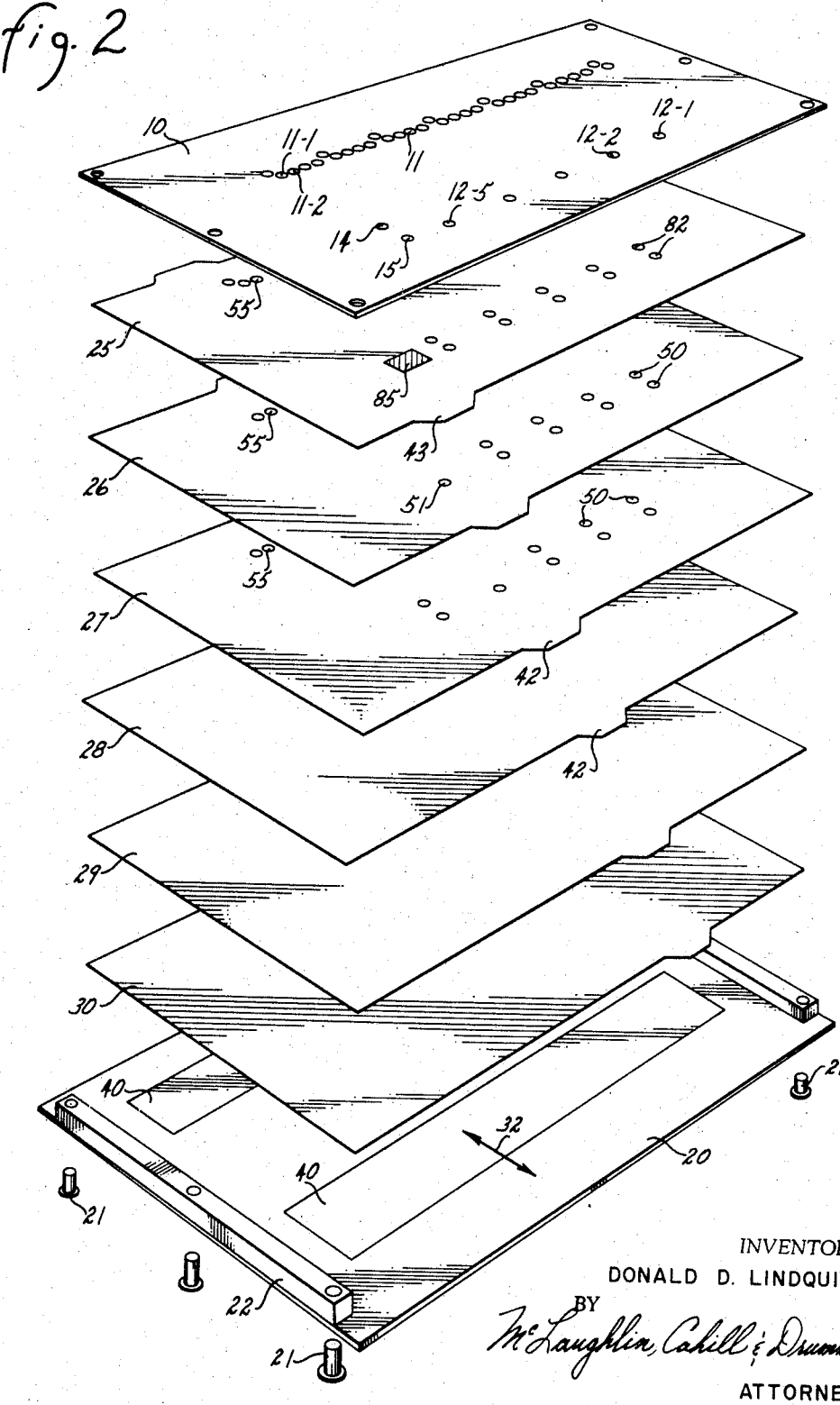
FIGURE 2 is a perspective exploded view of the training aid of FIGURE 1.

Referring to FIGURES 1 and 2, the training aid shown therein includes a first plate 10 having two groups of openings 11 and 12 therein. The group of openings 11 comprise a plurality of openings, each of which corresponds to a different non-binary number. The number system chosen for illustration in FIGURES 1 and 2 is the decimal system. Therefore, opening 11–1 represents the decimal number 1, opening 11–2 represents the decimal number 2, and so on. The second group of openings 12 comprise a plurality of openings, each corresponding to a different binary digit. Thus, opening 12–1 corresponds to the least significant binary digit in a five digit number. Opening 12–2 corresponds to the next significant digit. Two additional openings 14 and 15 are provided for purposes to be described more fully hereinafter.

A second plate 20 is provided and is secured to the first plate in fixed spaced-apart relationship through the expediency of rivets 21 and guide rails 22. A plurality of intermediate plates 25–30 are provided, each plate being positionable in either of two positions. The plates are free to slide between the guide rails 22 in a direction indicated by the arrow 32. Each of the intermediate plates 26–30 are provided with openings therein that are registerable with the openings in the top plate. The bottom plate 20 is also provided with colored portions 40 that are placed beneath the openings in the top and intermediate plates such that when the holes in the intermediate plates are in registry with one or more of the openings in the top plate, the colored portions of the bottom plate will become visible therethrough. To facilitate positioning of the intermediate plates, tabs 42 are provided thereon and extend horizontally outwardly of the top plate as shown in FIGURE 1. Thus, for example, to position intermediate plate 26 to its uppermost position (as shown in FIGURE 1), the tab 43 is pushed upwardly until it is flush with the edge of the top plate 10, thus forcing the tab 44 into view on the opposite side of the top plate 10. The intermediate plate 26 may then be returned to its original position by forcing tab 44 downwardly and thus forcing tab 43 to its original position.

The openings 50 in the intermediate plates 26–30 are arranged relative to the openings 12 in the top plate 10 such that when all of the intermediate plates are in their lowermost position all of the openings 12 in the top plate are closed and the colored portion 40 of the bottom plate will not be viewable through the top plate openings. When the intermediate plate 26 is moved to its alternate position, the opening 51 therein comes into registry with the opening 12–5 in the top plate 10; since all of the remaining plates 27–30 also have holes that are in alignment with the opening 12–5 regardless of the position of the corresponding plate, the colored portion of the bottom plate 20 will be viewable through the opening 12–5. Similarly, the openings 50 and all of the remaining plates are positionally coded such that there will be two openings for each of the openings 12 in the top plate with the exception of one top plate opening for which there will only be one opening in one of the intermediate plates. Thus, any combination of binary digits may be registered in the openings 12 of the top plate 10 by appropriately shifting the intermediate plates 26–30 to either or their two positions thus presenting a registered opening from the top plate through the intermediate plates to the bottom plate wherein the colored portion of the bottom plate becomes visible. In a similar manner, openings 55 are provided in each of the intermediate plates 26–30 and are registerably with the openings 11 in the top plate 10. The openings 55 are arranged relative to each other and relative to the top plate 10 so that only one of the openings 11 will present a view of the colored portion 40 of the plate 20 for any given setting of the intermediate plates. For example, referring to FIGURE 1, the positioning of the intermediate plates 26–30 is shown wherein the intermediate plates 26 and 28 have been extended to their uppermost position while the remainder of the intermediate plates 27, 29, and 30 remain in their lowermost positions. The colored portion of the bottom plate 20 thus becomes viewable through opening 12–5 and 12–3. These two openings, parts of a five digit binary word, represent a decimal numeric value of twenty. The openings 55 in the intermediate plates are arranged to register, as stated previously, with only one of the openings 11 in the top plate for any given setting of the intermediate plates. Thus, the opening 11 corresponding to the decimal number 20 is in registry with openings in the remainder of the plates such that the colored portion in the bottom plate is viewable therethrough. It may therefore be seen that the selection of any particular combination of binary digits in the binary word comprising the openings 12 will result in the registration of the openings in all of the plates corresponding to the opening 12 in the top plate representing the decimal equivalent of the binary word.

Figure 3:
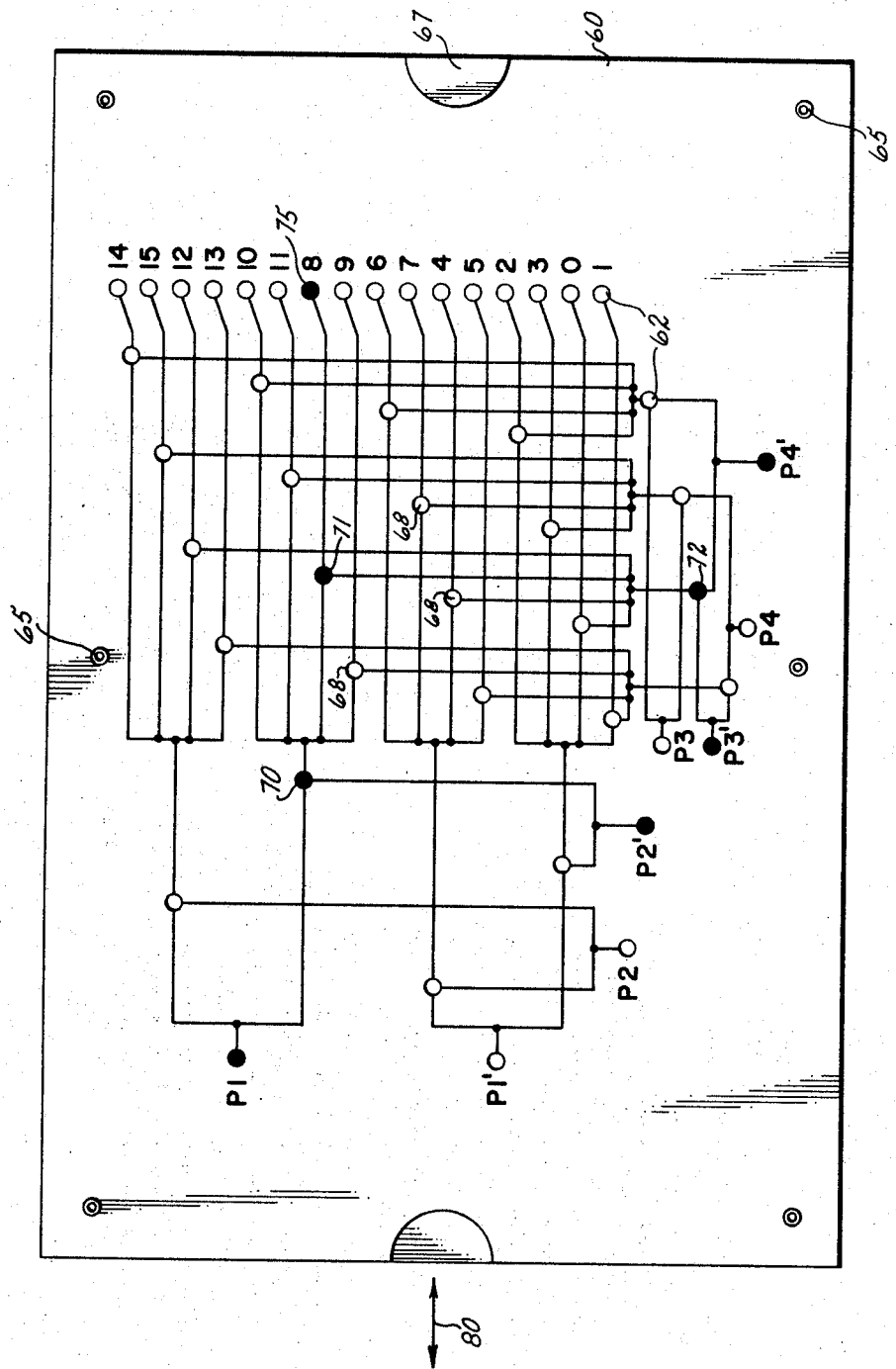
FIGURE 3 is another embodiment of a training aid of the present invention.

Referring to FIGURES 3 and 4, another embodiment is shown of the present invention. In the embodiment shown in these figures, the top plate 60 includes openings 62 therein. The openings 62 are arranged in a pattern connected by a schematic electrical circuit having a plurality of inputs P1, P1', P2, P2', P3, P3', P4, and P4'. The outputs of the electrical circuit are shown to the right and are represented by a plurality of holes, each accompanied by a decimal number adjacent thereto. The bottom plate 63 is in fixed spaced-apart relationship to the top plate 60 through the expediency of guide rails 64 and rivets 65. An intermediate plate 67 is provided and is color-coded by strips of colored tape such as shown at 68. The color coding is arranged relative to the openings 62 in the top plate such that when a combination of colored portions are viewable through the "inputs" P1–P4', a corresponding decimal opening also becomes "colored" to indicate the decimal output of the binary input. Further, the intermediate openings 68 in the top plate 60 provide a means whereby the electrical connections are emphasized to enable the student to follow the electrical circuit from the binary input to the corresponding decimal output. Each of the openings 68 may be considered the equivalent of diodes or transistors in an electrical circuit and which will "gate" or permit the passage of current upon the application of simultaneous signals thereto. For example, if we assume that the binary input will be 1000, then we will assume that the input terminals P1, P2', P3' and P4' are "high." As a result, the gate (transistor, etc.) 70, 71, and 72 will be switched "on" and power will be applied to the terminal represented by the opening 75 corresponding to the decimal number 8. By sliding the intermediate plate 67 in the direction indicated by the arrow 80, combinations of binary inputs to the input terminals may be selected and the gathing procedure of the schematic electrical circuit will be immediately evident to the student as well as the decimal numerical output.

The student may be required to determine the equivalent decimal output of a binary input before reading the answer provided by either of the embodiments of the present invention. To enable an input to be placed into the training aid without making available the immediate output, a gating plate is provided such as the plate 25 shown in FIGURE 2. The gating plate includes openings 82 therein to permit registration with the binary openings 12 in the top plate regardless of the position of the plate 25; however, the openings 55 therein are not coded and register with the openings 11 in the top plate only when the plate 25 has been moved to its uppermost position. When the plate 25 is in its lowermost position, all of the openings 11 are blocked or closed, thus preventing the student from viewing the resulting decimal output of the binary input. To provide a means for indicating the "gating" condition of the plate 25, a colored portion 85 is provided and is viewable through either of the openings 14 or 15 in the top plate 10. These openings, as indicated in FIGURE 1, are denominated read out and read off to clearly indicate that when the plate 25 is in the read off position, no decimal numerical value may be read from the training aid. To obtain the "answer" or decimal value of the binary input, the plate 25 must be shifted or moved to the read out position.

The materials used in the construction of the training aid of the present invention may vary considerably; for example, it has been found that very rigid cardboard is satisfactory. However, for larger devices suitable for use in classrooms by an instructor, devices made of plastic or reinforced plastic are more suitable. It will be obvious to those skilled in the art that a variety of modifications may be made in the present invention without departing from the spirit and scope thereof. The present invention is intended to be limited therefore only by the scope of the claims appended hereto.

I claim:

1. A training aid for indicating the non-binary numerical values of selected binary numbers comprising: a first plate having a plurality of openings therein, said openings arranged in two groups, the first of which comprises a plurality of binary digit openings, each corresponding to a different binary digit and the second of which comprises a plurality of non-binary digit openings, each corresponding to a different non-binary number; a second plate secured to said first plate in fixed spaced-apart relationship, said second plate having colored portions visible through and in registry with said openings in said first plate; a plurality of intermediate plates positioned between said first and second plates, each intermediate plate having two positions in the first of which said intermediate plate covers a predetermined binary digit opening in said first plate and in the second of which said intermediate plate uncovers said predetermined binary digit opening; said intermediate plates including a plurality of openings therein registerable with the openings in said first plate to permit, when in registry, the colored portions of said second plate to be viewed through the openings in said first plate; said openings in each intermediate plate being arranged relative to the openings in each other intermediate plate to permit the colored portions of said second plate to be viewed through only one of said non-binary number openings in said first plate for any given positional arrangement of said intermediate plates.

2. The training aid defined in claim 1 wherein said non-binary numbers are decimal numbers.

3. A training aid for indicating the non-binary numerical values of selected binary numbers comprising: a first plate having a plurality of openings therein, said openings arranged in two groups, the first of which comprises a plurality of binary digit openings, each corresponding to a different binary digit and the second of which comprises a plurality of non-binary digit openings, each corresponding to a different non-binary number; a second plate secured to said first plate in fixed spaced-apart relationship, said second plate having colored portions visible through and in registry with said openings in said first plate; a plurality of intermediate plates positioned between said first and second plates, each intermediate plate having two positions in the first of which said intermediate plate covers a predetermined binary digit opening in said first plate and in the second of which said intermediate plate uncovers said predetermined binary digit opening; said intermediate plates including a plurality of openings therein registerable with the openings in said first plate to permit, when in registry, the colored portions of said second plate to be viewed through the openings in said first plate; said openings in each intermediate plate being arranged relative to the openings in each other intermediate plate to permit the colored portions of said second plate to be viewed through only one of said non-binary number openings in said first plate for any given positional arrangement of said intermediate plates; a gating plate mounted adjacent said first plate, said gating plate being positionable to cover all non-binary number openings in said first plate.

4. The device defined in claim 3 wherein said non-binary numbers are decimal numbers.

5. A training aid for indicating binary-to-decimal conversions comprising: a first plate having a plurality of openings therein, said openings arranged in two groups the first of which comprises a plurality of binary digit openings each corresponding to a different binary digit and the second of which comprises a plurality of non-binary digit openings, each corresponding to a different non-binary number; said first plate having thereon a schematic electrical circuit joining said openings to form an electrical equivalent of said binary-to-decimal conversion; a second plate secured to said first plate in fixed spaced-apart relationship to said first plate; a third plate slidably positioned between said first and second plates and including colored portions; said colored portions arranged to be viewed through predetermined ones of said openings in accordance with the position of said third plate relative to said first plate.

References Cited
UNITED STATES PATENTS 3,071,320  1/1963  Scott.
3,332,156  7/1967  Reeves _____ 35—30

EUGENE R. CAPOZIO, *Primary Examiner.*

WILLIAM H. GRIEB, *Examiner.*